Figure 1:
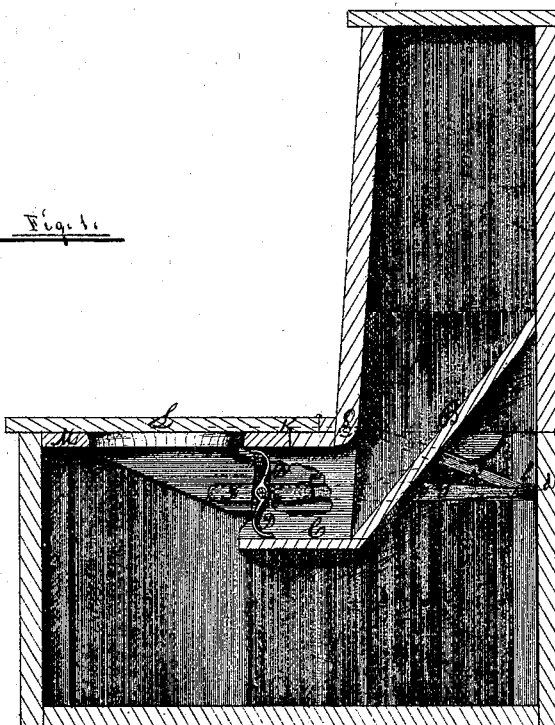

*J. A. Drake,*

*Earth Closet.*

No. 106,564. Patented Aug. 23, 1870.

Witnesses:
H. N. Jenkins
F. R. Plass

Inventor:
James Addison Drake

United States Patent Office.

JAMES ADDIZON DRAKE, OF NEW ORLEANS, LOUISIANA, ASSIGNOR TO HIMSELF AND MARY E. B. CLARK, OF SAME PLACE.

Letters Patent No. 106,564, dated August 23, 1870.

IMPROVEMENT IN EARTH-CLOSETS.

The Schedule referred to in these Letters Patent and making part of the same

I, JAMES ADDIZON DRAKE, of the city of New Orleans, State of Louisiana, have made a certain Improvement in Earth-Closets, of which the following is a specification.

My invention consists of a simple mechanical arrangement for precipitating the deodorizing substance at the proper times and in the proper quantity on the excreta which is deposited in the closet, from the hopper that contains the said substance.

The hopper I employ in connection with this improvement is what I call a rocking hopper, in consequence of its being supported on an axis in such manner as to be susceptible of being vibrated to a limited degree by a depression of the seat, the arrangement being such that, whenever the seat is occupied, it will be a little depressed by the weight of the occupant, and in being so will tilt the hopper slightly toward the front of the closet, and then, when the occupant rises, it will resume its normal position, and thus cause the hopper to go back to its original position also, the effect of such vibration or rocking motion of the hopper being to facilitate the descent of the dry earth, or its equivalent, down the hopper to its point of delivery, which is from a rectangular box or chute at the foot of the inclined back of the hopper that communicates with the hopper.

A reference to the drawing will at once explain the precise nature of my invention, and show its mode of operation.

On the drawing—

A represents a rocking hopper, to contain the deodorizing agent.

This hopper is so constructed as to have its rear incline toward the front of the closet, as shown by the sectional view presented on the drawing at B, and terminate several inches below the seat, and just under its rear edge, where it connects with a horizontal rectangular box-chute, C.

This chute is open at its front end, but is closed a little back from said end by a revolving valve, consisting of curved or scroll wings, D D', projecting from an axis, E.

The drawing shows but two such wings projecting in opposite directions from the axis E, but obviously, if it should ever be desirable, three, four, or more of these wings might be used, it being only necessary so to place them that they will close the chute and prevent the deodorizing substance from escaping therefrom whenever the closet is not in use.

The axis E is supported in proper journals in the frame-work of the closet, or, rather, in the sides of the chute, and extend outside the right-hand side of said chute sufficiently to allow a double crank-bar, F, to be securely fastened on its end.

Figure 3:

This crank-bar has a recess or groove in it that extends very nearly its whole length, as shown at Figure 3, which is a detached view of it.

In this groove is fitted a pin, $a$, in such manner as to move therein from one end of it to the other.

The pin $a$ passes through a pitman, G, to which it is immovably secured, and extends beyond the same far enough to enter a hollow guide, H, (see Figure 2 for a detached view of this guide,) which is permanently fixed to the frame of the closet in horizontal position, and at right angles to the axis E.

The distance between the crank F and the guide H need not be greater than is just necessary to permit the free working of the intermediate parts. These parts consist of the pitmen G and I, which are connected together by a pivot or articulating joint, as shown at $b$.

The pitman G, from the point of its connection with the crank F, by means of the pin E, is placed on a line parallel to the guide H, and is supported by an arm, J, projecting from and firmly secured to the said guide at a point just far enough from the rear end of said pitman to prevent the latter from ever passing off it in the operation of the mechanism.

Figure 2:
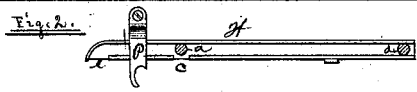

The under side of the pitman G is so shaped that in the rearward movement of said pitman it will press on the arm J sufficiently to slightly elevate the front end of said pitman at the very moment the pin $a$ reaches the notch $c$, and cause the said pin to enter said notch, as shown at fig. 2. This occurs when the pitman G attains the limit of its backward stroke. Reciprocating motion is imparted to the pitman G in this way.

A bar, K, shown by dotted lines at Figure 1, is permanently secured to the cover L of the seat M of the closet, in the plane of its surfaces, so as to project a little behind the rear edge of said cover, where, at its end, it is connected to pitman I by an articulating joint.

The pin $d$ at this joint extends, like the pin $a$ on the side next the guide H, far enough from the same to enter the same, as shown at fig. 2, and hence, by holding the end of pitman G, which is connected with pitman I in a given horizontal line, co-operates with the arm J in elevating the other end of said pitman G sufficiently to throw up the pin $a$ through the notch $c$.

An inspection of fig. 1 will show that, when the cover L is down on the seat of the closet, the pin $a$ is at one end of the double crank F. Fig. 2 shows said pin to have just entered the guide H, through notch $c$, when the pin $a$ occupies that position in said crank. Now, when these parts are thus placed, the pitman G has made its full backward stroke through the action of pitman I, and any movement of the parts must of necessity be in the opposite direction.

A movement is effected by simply raising the cover L, for this carries down the rear extremity of the arm K, and by doing so draws forward the pitman I, and through it the pitman G also, the pin $a$ meanwhile gliding along the groove in crank F, without moving this crank, until said pin reaches the opposite or front end of the groove.

The parts are so adjusted that, when this takes place, the pin $a$ will have reached a notch, $e$, in the slide H, through which it will fall by its gravity, and carry with it the front end of the crank F. This occurs when the cover L has been carried up to the limit of its elevation, and occupies a position at right angles to that occupied by it when down on the seat M.

It will be perceived that, up to this time, no movement of the valve or its wings D D' has taken place, and that therefore the chute C remains closed. But when the cover L is closed in consequence of the changed relations of the parts, the pin $a$ being now a little below the axis E, instead of in the same horizontal plane with it, a semi-rotation of the crank F is brought about by the impingement of said pin $a$ against the under side of the groove in the same, until it reaches the axis of the same, and then against the upper side of said groove until it reaches the end of said groove and the parts have resumed the position shown at figs. 1 and 2.

The semi-rotation of the crank F and axis E of course causes the valve to make half a revolution, thereby carrying the wing D to the place occupied by wing D', and in doing so throwing out the prescribed quantity of dry earth, or its equivalent, the same being taken up by wing D as it makes its semi-revolution, in consequence of its scoop or scroll form, with unfailing certainty. This operation is repeated indefinitely, or whenever the closet is used.

In order to pack the earth, it will be understood, of course, in loose form, in the chute C, so as always to have a sufficient supply therein for the efficient action of the scroll-winged valve, I slant the rear B of the hopper, as I have before mentioned, as shown on the drawing, and also give to the hopper itself a slight rocking motion, whenever the closet is used, by supporting it in part on an axis, O, and providing for a slight depression of the seat M by the weight of the user of the closet, as before described.

In order to cause the pin $a$ to drop through the opening or notch $e$ with absolute certainty, I may apply positive force through the agency of a pawl, P, which is so adjusted as to exert a downward pressure on said pin at the very moment such pressure is needed, but I scarcely think, in the practice of my invention, such a provision will ever be necessary.

What I claim is—

1. The combination of a cover, L, of the seat of an earth-closet with the pitmen I and G, the groove-crank F, the axis E, and scroll-winged valve D D', and the guide H, when these parts are constructed and united for conjoint operation, in the manner and for the purpose herein set forth.

2. The above combination, in combination with a rocking hopper, A, when the latter is provided with an inclined back terminating in a box-chute, C, and all the parts are arranged separately and relatively to each other, substantially as herein described, for the purpose set forth.

In witness whereof I have hereunto set my hand in presence of two subscribing witnesses.

JAMES ADDIZON DRAKE.

Witnesses:
H. N. JENKINS,
F. R. PLACE.